US010079541B1

(12) United States Patent
Taban

(10) Patent No.: US 10,079,541 B1
(45) Date of Patent: Sep. 18, 2018

(54) WIDE INPUT, WIDE OUTPUT, HIGH EFFICIENCY, ISOLATED DC-DC CONVERTER-BATTERY CHARGER

(71) Applicant: Murata Manufacturing Co., Ltd., Nagaokakyo-shi, Kyoto-fu (JP)

(72) Inventor: Ion Taban, Markham (CA)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days.

(21) Appl. No.: 15/602,247

(22) Filed: May 23, 2017

(51) Int. Cl.
| G05F 1/00 | (2006.01) |
| H02M 3/158 | (2006.01) |
| H02M 3/335 | (2006.01) |
| H02J 7/00 | (2006.01) |

(52) U.S. Cl.
CPC ......... H02M 3/1582 (2013.01); H02J 7/0052 (2013.01); H02M 3/33546 (2013.01); *H02J 2007/0059* (2013.01)

(58) Field of Classification Search
CPC .. H02M 3/158; H02M 3/1588; H02M 3/1582; H02M 2001/0045; H02M 2001/0067
See application file for complete search history.

(56) References Cited

U.S. PATENT DOCUMENTS

| 5,132,888 | A | * | 7/1992 | Lo | .......... | H02M 3/337 |
| | | | | | | 363/132 |
| 9,331,565 | B2 | | 5/2016 | Wei et al. | | |
| 2010/0187336 | A1 | * | 7/2010 | Ohlhafer | ................ | F02M 63/06 |
| | | | | | | 239/585.1 |
| 2011/0025289 | A1 | | 2/2011 | Wang et al. | | |
| 2011/0187336 | A1 | * | 8/2011 | Wu | ........................... | G05F 1/10 |
| | | | | | | 323/282 |
| 2011/0261590 | A1 | | 10/2011 | Liu | | |

FOREIGN PATENT DOCUMENTS

| JP | 2013-526252 A | 6/2013 |
| JP | 2016-195511 A | 11/2016 |

\* cited by examiner

*Primary Examiner* — Adolf Berhane
*Assistant Examiner* — Afework Demisse
(74) *Attorney, Agent, or Firm* — Keating & Bennett, LLP

(57) ABSTRACT

A switching power conversion circuit includes a pre-regulator circuit that is operated in buck, boost, or bypass mode and that includes a first switching circuit that receives an input DC voltage and outputs a first DC voltage; a resonant circuit including a second switching circuit that receives the first DC voltage and outputs an output DC voltage; a resonant control circuit that regulates the output DC voltage by transmitting a link min set control signal and a link max set control signal and by controlling a switching frequency of the second switching circuit; and a pre-regulator control circuit that receives the link min set control signal and the link max set control signal and that controls the first switching circuit based on the link min set control signal and the link max set control signal to regulate the first DC voltage.

16 Claims, 7 Drawing Sheets

Prior Art

WIDE INPUT, WIDE OUTPUT, HIGH EFFICIENCY, ISOLATED DC-DC CONVERTER-BATTERY CHARGER

BACKGROUND OF THE INVENTION

1. Field of the Invention

The present invention relates to direct-current-to-direct-current (DC-DC) power converters. More specifically, the present invention relates to a DC-DC converter as a component of a power conversion module between a high-voltage (HV) battery and a low-voltage (LV) battery that can be used in electric/hybrid vehicles, for example.

2. Description of the Related Art

A DC-DC converter used for electric/hybrid vehicles is a power conversion module, located between the high-voltage (HV) battery (battery HV) and the low-voltage (LV) battery (battery LV). The DC-DC converter powers the vehicle's ancillary (or auxiliary) loads connected to the battery LV, and charges the battery LV, by converting energy from the battery HV.

FIG. 1 is a schematic diagram of a power conversion circuit of the prior art. FIG. 1 shows a block representing the DC-DC converter 10 between the battery HV and the battery LV, where the battery LV powers a sum of loads Rload.

The voltage outputs of the batteries HV and LV can vary over a wide range, based on each battery state of charge (SOC). The ratio of the highest maximum voltage at the maximum SOC to the lowest minimum voltage at the minimum SOC can be as high as, for example, 2.4:1 for each battery HV and LV. The DC-DC converter 10 shown in FIG. 1 should work well with very high conversion efficiency throughout the entire operating ranges of the HV and LV voltages. The operating ranges include the extreme conditions such as (i) HV minimum and LV maximum, and (ii) HV maximum and LV minimum.

The DC-DC converter 10 should also provide galvanic isolation between the batteries HV and LV for safety reasons.

An isolated DC-DC converter topology that provides a high efficiency (i.e., low losses) is a resonant-type converter. Resonant-type converters are typically referred to as LLC converters (including two inductors and a capacitor) because these converters do not incur switching losses, but only conduction losses when operating at or close to the converters' resonant frequency. A drawback of an LLC converter is that when operating at frequencies that are far from resonant frequencies, converter efficiency degrades and some component stresses rapidly increase.

One solution to these problems is to use a non-isolated converter, e.g., a non-isolated pre-regulator, located before the resonant converter to pre-regulate the input voltage of the LLC converter. The pre-regulated input voltage is commonly referred to as the DC link voltage. The non-isolated pre-regulator can be a buck converter, which decreases the DC link voltage below the HV minimum. Some drawbacks of using a buck converter are impact on efficiency and high ripple currents resulting in large capacitors.

A single full-bridge converter can also be used, but a full-bridge converter requires large magnetic components and is less efficient. A single LLC converter is also less efficient and can only handle a narrower ratio of the highest maximum battery voltage to the lowest minimum battery voltage.

A DC-DC converter that can operate very efficiently throughout a wide range of input and output voltages, as well as wide range of output current is needed. The DC-DC converter also needs to have a small mass and a small volume and to operate at very low and very high temperatures for a long time (for example, about 15 years or more).

SUMMARY OF THE INVENTION

To overcome the problems described above, preferred embodiments of the present invention provide a configurable, high-efficiency, non-isolated, buck-boost pre-regulator located before the isolated LLC converter so that the pre-regulator and the LLC converter operate at high efficiency throughout wide input and output voltage ranges. Some preferred embodiments of the present invention include an interleaved buck-boost pre-regulator.

While a buck-boost pre-regulator can be initially more expensive and more difficult to implement than a buck or a boost pre-regulator, a buck-boost pre-regulator can be very efficient over a larger operating voltage range during the lifetime of the pre-regulator. A typical buck-boost pre-regulator operates in bypass mode for a single input voltage level. The buck-boost pre-regulator of the preferred embodiments of the present invention operates in bypass mode over a range of input voltage levels, which maximizes high efficiency operation of the pre-regulator.

At higher rated power levels, the LLC converter can include dual interleaved channels, and the number of interleaved buck-boost channels can also be increased.

As described below in aspects of preferred embodiments of the present invention, the LLC converter is operated at or close to its resonant frequency. The optimum DC link voltage is preferably calculated to maximize the overall DC-DC converter efficiency. A converter efficiency is equal to the output power divided by the input power, i.e., (the output voltage multiplied by output current) divided by (the input voltage multiplied by the input current). The overall DC-DC converter efficiency is equal to the pre-regulator efficiency multiplied by the LLC converter efficiency. The LLC converter is most efficient when operated at its resonant frequency, and the pre-regulator is most efficient when operated in bypass mode. The optimum DC link voltage can be calculated by (i) first calculating the DC link voltage required for resonant operation of the LLC converter based on the actual or the externally set LV voltage and the load current and (ii) then, the calculated DC link voltage is expanded to a range of possible DC link voltages around a DC link voltage required for resonant operation of the LLC converter, between Vdclink min set and Vdclink max set, (iii) then the optimum DC link voltage is adjusted, within the above range, based on the HV voltage to maximize operation of the pre-regulator in the bypass mode, while ensuring that the LLC converter operates at or close to its resonant frequency. The pre-regulator mode (i.e., buck, boost, or bypass) is determined, and if in buck or boost mode, the pre-regulator duty cycle is calculated based on the HV voltage and the optimum DC link voltage.

Also, preferred embodiments of the present invention eliminate the need for additional inrush current limiting circuits, such as a relay connected with either a large resistor or thermistor. Preferred embodiments of the present invention are configured and controlled to slowly charge a DC link capacitor, during the first application of the HV voltage, such that the input inrush current is less than the maximum allowed current.

The flexibility of the preferred embodiments of the present invention allows for the use of readily available 650 V power components. The ability to adjust the DC link voltage is beneficial as it results in the DC link voltage being between HV minimum and HV maximum, and not lower than HV minimum or not higher than HV maximum. A typical HV minimum is, for example, 200 V, and a typical HV maximum is, for example, 480 V.

Preferred embodiments of the present invention reduce and spread out power losses of the converter across more components to eliminate hot spots. This benefit, along with the lower losses due to a highly efficient power circuit, minimizes component stress when operating at higher temperatures. Cooler circuit operation also allows for a simpler and cheaper cooling system. For example, it is possible in some applications to use air cooling instead of water cooling.

The preferred embodiments of the present invention can be used in a family of DC-DC converters for electric/hybrid vehicles, for example, with different nominal output voltages (e.g., 48 V, 24 V, 12 V) and different power levels (e.g., 1-10 kW).

According to a preferred embodiment of the present invention, a switching power conversion circuit includes a pre-regulator circuit that is operated in buck mode, boost mode, or bypass mode and that includes a first switching circuit that receives an input DC voltage and outputs a first DC voltage; a resonant circuit including a second switching circuit that receives the first DC voltage and outputs an output DC voltage; a resonant control circuit that regulates the output DC voltage by transmitting a link min set control signal and a link max set control signal and by controlling a switching frequency of the second switching circuit; and a pre-regulator control circuit that receives the link min set control signal and the link max set control signal from the resonant control circuit and that controls the first switching circuit based on the link min set control signal and the link max set control signal from the resonant control circuit to regulate the first DC voltage.

Preferably, the first switching circuit includes a first switch and a second switch, and the pre-regulator control circuit operates the first switch and the second switch with variable duty cycle pulses. The pre-regulator control circuit preferably operates the pre-regulator circuit:
  in a buck mode by switching the first switch on and off and the second switch off;
  in a boost mode by switching the first switch on and the second switch on and off; and
  in a bypass mode by switching the first switch on and the second switch off.

The first DC voltage is preferably determined based on resonant operation of the resonant circuit, the output DC voltage, and the input DC voltage. The first DC voltage is preferably further determined based on an input current into the pre-regulator circuit, a current between the pre-regulator circuit and the resonant circuit, and an output current of the resonant circuit. The first DC voltage is preferably determined based on efficiencies of the pre-regulator circuit and of the resonant circuit.

Preferably, the first switching circuit includes first, second, third, and fourth switches, and the pre-regulator control circuit operates the first, second, third, and fourth switches with variable duty cycle pulses. The pre-regulator control circuit preferably operates the pre-regulator circuit:
  in a synchronous buck mode by switching the first switch and third switch on and off, the second switch off, and the fourth switch on;
  in a synchronous boost mode by switching the first switch on, the third switch off, and the second switch and the fourth switch on and off; and
  in a synchronous bypass mode by switching the first switch and the fourth switch on and the second switch and the third switch off.

The pre-regulator circuit further preferably includes at least one additional first switching circuit that is interleaved with the first switching circuit. The resonant circuit further preferably includes at least one additional second switching circuit that is interleaved with the second switching circuit.

According to a preferred embodiment of the present invention, a switching power conversion circuit includes a pre-regulator circuit that is operated in buck mode, boost mode, or bypass mode and that includes at least two first switching circuits in parallel, that receives an input DC voltage, and that outputs a first DC voltage; and a resonant circuit including at least one second switching circuit that receives the first DC voltage and outputs an output DC voltage.

The switching power conversion circuit further preferably includes a resonant control circuit that regulates the output DC voltage by transmitting a link min set control signal and a link max set control signal and by controlling a switching frequency of the at least one second switching circuit; and a pre-regulator control circuit that receives the link min set control signal and the link max set control signal from the resonant control circuit and that controls the at least two first switching circuits based on the link min set control signal and the link max set control signal to regulate the first DC voltage. Preferably, each of the at least one first switching circuits includes a first switch, a second switch, a third switch, and a fourth switch and the pre-regulator control circuit operates each of the first through fourth switches with variable duty cycle pulses. The pre-regulator control circuit preferably operates each of the at least two first switching circuits:
  in a synchronous buck mode by switching the first switch and third switch on and off, the second switch off, and the fourth switch on;
  in a synchronous boost mode by switching the first switch on, the third switch off and the second switch and the fourth switch on and off; and
  in a synchronous bypass mode by switching the first switch and the fourth switch on and the second switch and the third switch off.

The first DC voltage is preferably determined based on resonant operation of the resonant circuit, the output DC voltage, and the input DC voltage. The first DC voltage is preferably further determined based on an input current into the pre-regulator circuit, a current between the pre-regulator circuit and the resonant circuit, and an output current of the resonant circuit. The first DC voltage is preferably determined based on efficiencies of the pre-regulator circuit and of the resonant circuit.

Preferably, each of the at least one first switching circuits includes a first switch and a second switch; and the pre-regulator control circuit operates each of the first and second switches with variable duty cycle pulses. The pre-regulator control circuit operates each of the at least two first switching circuits:
  in a buck mode by switching the first switch on and off and the second switch off;
  in a boost mode by switching the first switch on and the second switch on and off; and
  in a bypass mode by switching the first switch on and the second switch off.

The at least one second switching circuit preferably includes two second switching circuits that are interleaved with each other.

The above and other features, elements, characteristics, steps, and advantages of the present invention will become more apparent from the following detailed description of preferred embodiments of the present invention with reference to the attached drawings.

DETAILED DESCRIPTION OF PREFERRED EMBODIMENTS

The isolated DC-DC converter according to the first preferred embodiment of the present invention is a configurable, high-efficiency, non-isolated, buck-boost pre-regulator located before an isolated LLC converter. As previously stated, the cascaded pre-regulator with the LLC converter operates at high efficiency.

Figure 1:
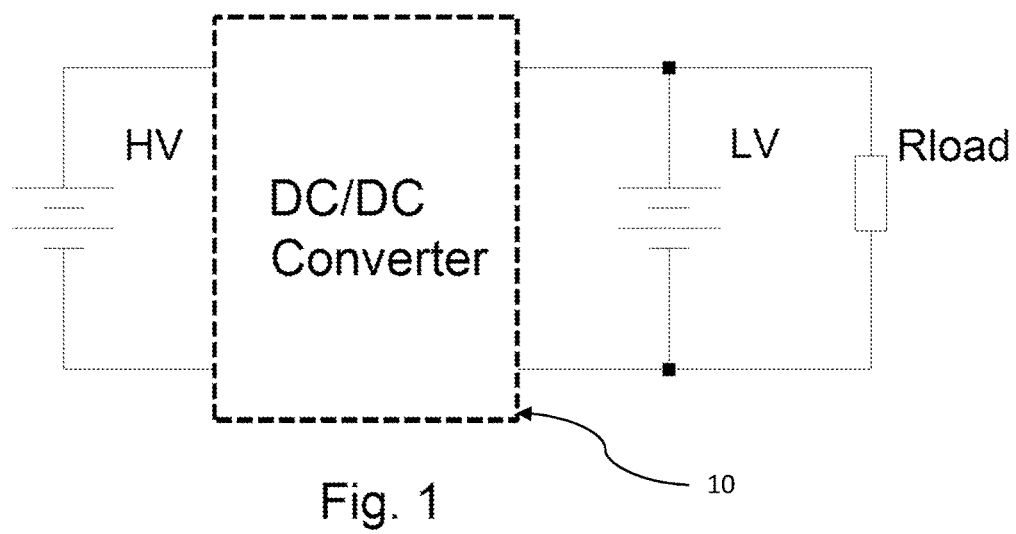
FIG. 1 is a schematic diagram of a power conversion circuit of the prior art.
Figure 2:
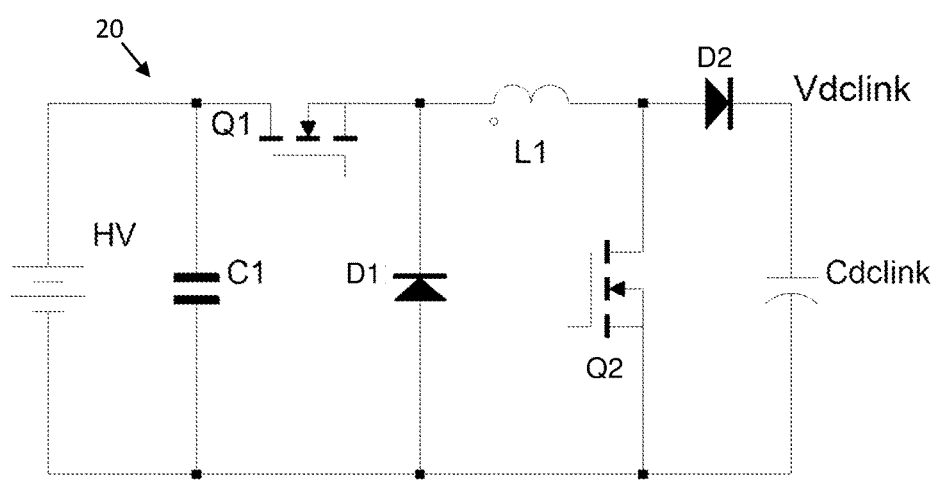
FIG. 2 illustrates an exemplary circuit diagram of a pre-regulator according to a first preferred embodiment of the present invention.
Figure 3:
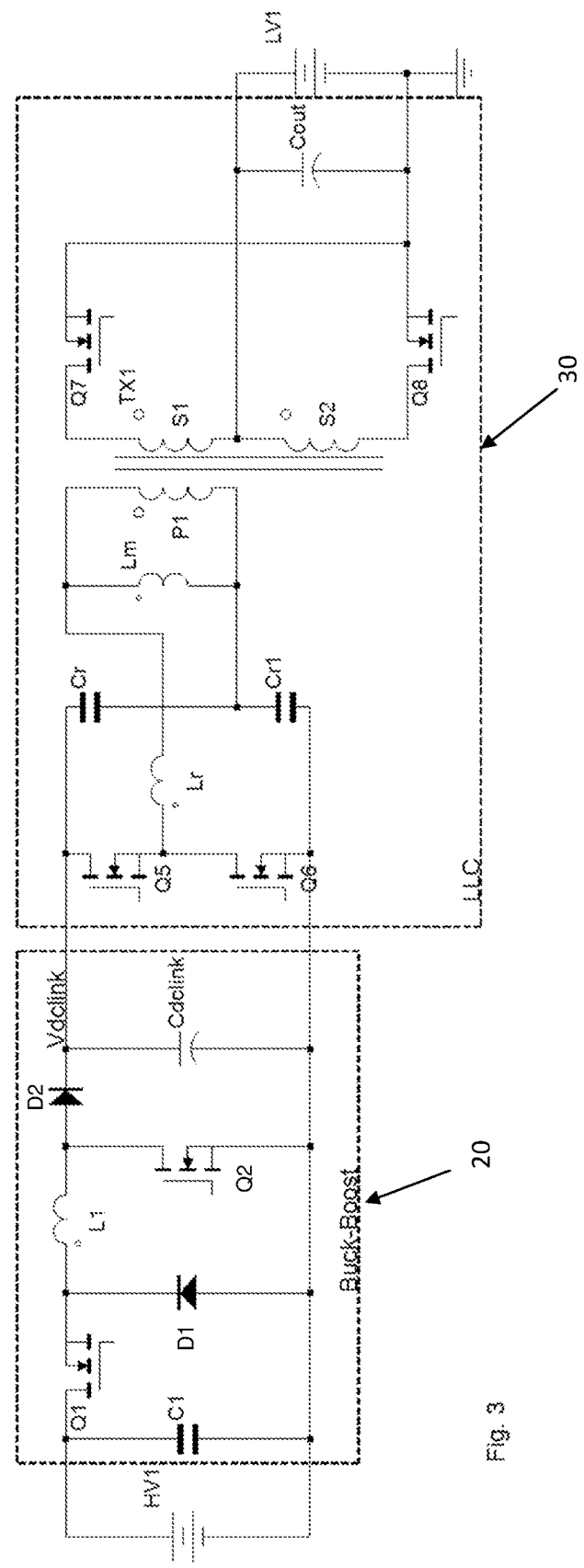
FIG. 3 illustrates an exemplary circuit diagram of a pre-regulator in a cascade connection with an LLC converter according to the first preferred embodiment of the present invention.

FIG. 2 illustrates a circuit diagram of a pre-regulator 20 that can be used in a cascade connection with an LLC converter 30 (shown in FIG. 3). The pre-regulator 20 shown in FIG. 2 is on the side with battery HV and receives an input from the battery HV.

The pre-regulator 20 includes an input capacitor C1, a first diode D1, a first switch Q1, an inductor L1, a second switch Q2, a second diode D2, and a link capacitor Cdclink. To increase overall circuit efficiency, the diodes D1 and D2 can be replaced by switches. The output voltage of the pre-regulator 20 is represented by Vdclink, which is also the input voltage of the LLC converter 30.

As shown in FIG. 2, the input capacitor C1 is connected in parallel with the input from the HV battery and the first diode D1. For simplicity, FIG. 2 does not show an electromagnetic interference (EMI) LC filter between the battery HV and the pre-regulator 20. The input capacitor C1 can be a part of such an EMI LC filter. A first terminal of the first switch Q1 is coupled to the positive terminal of the battery HV and a first terminal of the input capacitor C1. The switches Q1, Q2 are shown as an n-channel metal-oxide-semiconductor field-effect transistor (MOSFET) transistor. However, other types of switches or transistors can be also used. A second terminal of the first switch Q1 is connected to the cathode terminal of the first diode D1 and to the positive terminal of the inductor L1. A second terminal of the input capacitor C1 is connected to the negative terminal of the battery HV, the anode terminal of the first diode D1, the second terminal of the second switch Q2, and the second terminal of the link capacitor Cdclink. The negative terminal of the inductor L1 is connected to the first terminal of the second switch Q2 and the anode of the second diode D2. The cathode of the second diode D2 is connected to the first terminal of the link capacitor Cdclink. The pre-regulator 20 can adjust its output. That is, the pre-regulator 20 can adjust the voltage Vdclink. For example, the pre-regulator 20 can adjust the voltage Vdclink to in between the HV minimum and HV maximum.

FIG. 3 illustrates a circuit diagram of the pre-regulator 20 shown in FIG. 2 in a cascade connection with the LLC converter 30. The pre-regulator 20 provides the input to the LLC converter 30 as the pre-regulator 20 is between the battery HV1 and the LLC converter 30. The LLC converter 30 outputs to the battery LV1. During startup, the pre-regulator 20 slowly charges the DC link capacitor Cdclink so that the input current to the DC-DC converter is less than the DC-DC converter's maximum allowed current, which allows for the DC-DC converter to be designed without any separate inrush limiting circuit.

The pre-regulator 20 of FIG. 3 is the same as that described above with respect to FIG. 2. A description here will be omitted for brevity.

As shown in FIG. 3, the LLC converter 30 includes switches Q5, Q6, Q7, and Q8; inductors Lr and Lm; capacitors Cr and Cr1; transformer TX1 that includes primary winding P1 and dual secondary windings S1 and S2; and output capacitor Cout. The LLC converter 30 is between the pre-regulator 20 and the battery LV1 and includes Vdclink as the input voltage.

In the LLC converter 30 of FIG. 3, switches Q5 and Q6 and capacitors Cr and Cr1 preferably are arranged in a half bridge arrangement. Components of the LLC converter 30 can also be arranged in a full bridge arrangement with four switches rather than two. Also, the spilt resonant capacitors Cr and Cr1 can be combined into a single component.

As shown in FIG. 3, the first terminal of switch Q5 is connected to the positive output of the pre-regulator 20 at the link capacitor Cdclink and the first terminal of capacitor Cr. The second terminal of switch Q5 is connected to the positive terminal of inductor Lr and the first terminal of switch Q6. The second terminal of capacitor Cr is connected to the first terminal of capacitor Cr1, the negative terminal of inductor Lm, and the negative terminal of the primary side P1 of transformer TX1. The second terminal of switch Q6 is connected to the second terminal of capacitor Cr1 and the second terminal of the link capacitor Cdclink. The negative side of the inductor Lr is connected to the positive terminal of inductor Lm and the positive terminal of primary winding P1. The center tap of the secondary side of transformer TX1 between the secondary windings S1 and S2 is connected to the positive side of the battery LV1. The switches Q7 and Q8 are synchronous rectifiers that are arranged in a rectification stage. The positive terminal of secondary winding S1 is connected to the first terminal of switch Q7. Likewise, the negative terminal of secondary winding S2 is connected to the first terminal of switch Q8. Second terminals of switches Q7 and Q8 are connected to the negative terminal of the battery LV1.

Depending on the high voltage input, the output voltage, and the load current, the pre-regulator 20 shown in FIGS. 2 and 3 can be operated as a buck converter, as a boost converter, or as a bypass. This allows the DC-DC converter to operate with a DC link voltage above the HV minimum voltage and below the HV maximum voltage, which broadens the options of available components that can be selected for the circuit design.

The voltage Vdclink is adjusted to keep the LLC converter operating always at or close to resonance. The optimum DC link voltage can be calculated by (i) first calculating the DC link voltage required for resonant operation of the LLC converter based on the actual or the externally set LV voltage and the load current and (ii) then, the calculated DC link voltage is expanded to a range of possible DC link voltages around a DC link voltage required for resonant operation of the LLC converter, between Vdclink min set and Vdclink max set, (iii) then the optimum DC link voltage is adjusted, inside the above range, based on the HV voltage to maximize operation of the pre-regulator in the bypass mode. Vdclink is calculated as (LV*2*Np)/(Ns*G), where LV is the output voltage, Np is the transformer primary number of turns, Ns is the secondary numbers of turns, and G is the LLC converter gain (which=1 at resonance and is less than 1 or higher than 1 at frequencies around resonance). Vdclink min set and Vdclink max set values can be determined empirically, as discussed below.

The voltage Vdclink is regulated by feedback control of the pre-regulator converter, and the Vdclink voltage range is set by the LLC control circuit 50. Because the voltage Vdclink is a regulated output voltage within a preset voltage range, which is regularly updated, the LLC converter can be operated at or close to resonance, and operation of the pre-regulator in bypass mode can be maximized. This scheme maintains a high overall efficiency for large ratios of the highest maximum voltage at the maximum SOC to the lowest minimum voltage at the minimum SOC for each battery HV and LV. The LLC isolation transformer TX1 can be provided with different turns ratios of primary to secondary windings based on different nominal voltages of the LV battery (e.g., a turns ratio of Np/1 with a 12 V battery, a turns ratio of Np/2 with a 24 V battery, a turns ratio of Np/4 with a 48 V, etc.).

Figure 6:
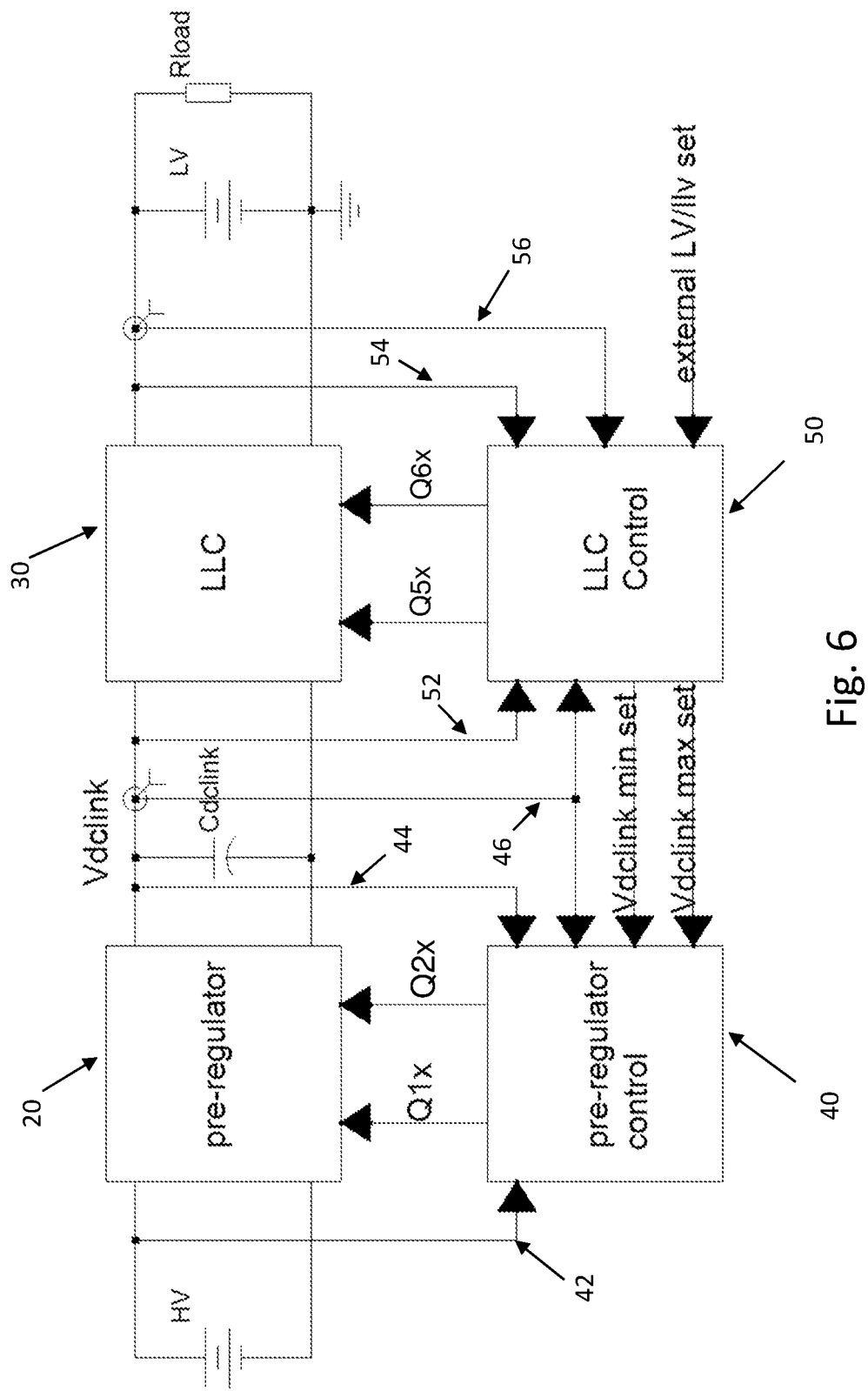
FIG. 6 illustrates an exemplary block diagram of a pre-regulator in a cascade connection with an LLC converter and control circuits according to the first preferred embodiment of the present invention.
Figure 7:
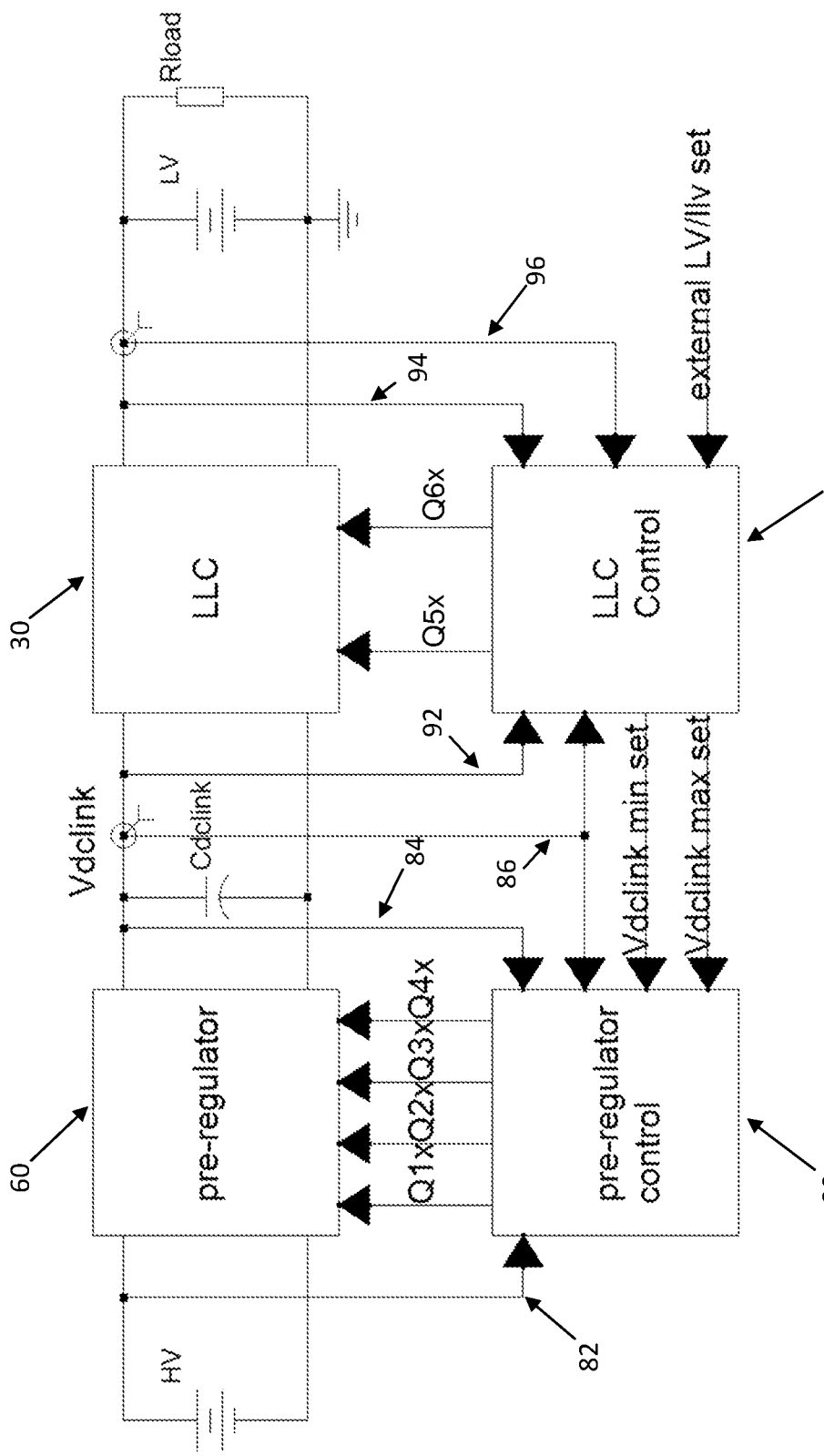
FIG. 7 illustrates an exemplary block diagram of an interleaved pre-regulator in a cascade connection with an LLC converter and control circuits according to the second preferred embodiment of the present invention.

A control circuit (not shown in FIG. 3 or 4) drives the switches on or off with high frequency variable duty cycle pulses. The control circuit can include a custom controller using, for example, a digital signal processor (DSP). As shown in FIGS. 6 and 7 (discussed below), the control circuit can include a control circuit for the pre-regulator and a control circuit for the LLC converter with a serial communication link between the two. Alternatively, a single control circuit could be used to control the pre-regulator and the LLC converter. The control circuit(s) can be programmed or configured to provide the functions discussed herein. For example, the control circuit(s) can be programmed or configured to calculate the optimum DC link voltage based on the received signals corresponding to the input and output voltages and input and output currents of the pre-regulator and the input and output voltages and the input and output currents of the LLC converter.

To operate the pre-regulator in buck mode to provide a lower voltage, the control circuit drives switch Q1 to switch ON/OFF with a high-frequency variable duty cycle and switch Q2 to be only OFF.

Referring back to FIG. 3, to operate the pre-regulator 20 in boost mode to provide a higher voltage, the control circuit drives switch Q1 to be only ON and switch Q2 to switch ON/OFF with a high-frequency variable duty cycle.

To operate the pre-regulator 20 in bypass mode to provide the voltage from the battery HV, the control circuit drives switch Q1 to be only ON and switch Q2 to be only OFF.

FIG. 6 shows a block diagram of the pre-regulator 20 in a cascade connection with the LLC converter 30 including control circuits 40, 50. FIG. 6 includes a block representing the pre-regulator 20 of FIG. 2 in between the battery HV and a block representing the LLC converter 30. FIG. 6 also includes a block representing a pre-regulator control circuit 40 that controls the switching of the pre-regulator 20, and a block representing an LLC control circuit 50 that controls the switching of the LLC converter 30.

The pre-regulator control circuit 40 controls the switching of the switches Q1 and Q2 in the pre-regulator 20 by providing signals Q1x and Q2x, where x is used to denote the possibility of controlling more than one phase as discussed below. The LLC control circuit 50 controls the switching of the switches Q5 and Q6 in the LLC converter 30 by providing signals Q5x and Q6x. Switches Q5 and Q6 can operate at the same high switching frequency, each with approximately 50% duty cycle, but in opposite phases such that when one of the switches Q5 and Q6 is on, the other switch Q6 and Q5 is off. During the switching transition times (i.e., from on to off, from off to on) there is a small dead-time period when both switches Q5 and Q6 are off to ensure that both switches Q5 and Q6 are not on at the same time. The switching frequency is varied in a small range around the resonant frequency to adjust the LLC converter gain, and therefore to adjust the LV voltage and/or current. The pre-regulator 20 in FIG. 6 can be replaced with an interleaved pre-regulator 60 as discussed below, and the LLC converter 30 in FIG. 6 can be replaced with an interleaved LLC converter 70 as discussed below. The pre-regulator control circuit 40 can control the switching of the switches Q1a, Q1b, Q2a, and Q2b in the pre-regulator 60 by providing signals Q1x and Q2x, where x=a and b for two phases of the pre-regulator 60. The LLC control circuit 50 can control the switching of the switches Q5a, Q5b, Q6a, and Q6b in the LLC converter 70 by providing signals Q5x and Q6x, where x=a and b for two phases in the LLC converter 70.

The DC link voltage is adjusted to maintain the LLC converter 30 close to the resonance to maximize operation of the pre-regulator 20 in the bypass mode to maintain high overall circuit efficiency. The LLC control circuit 50 can regulate the output current of the LLC converter 30 to the LV battery and load to be equal to the external current set by the external battery management system (BMS) (not shown). If the BMS requires constant power, then the LLC control 50 can regulate both the output current and voltage to be equal to those set by the BMS. If there is no BMS, then the LLC control 50 can regulate either the output current or the output voltage to maintain a preset nominal battery voltage while various loads are discharging the battery.

The LLC circuit regulation feedback loop can be controlled by the LLC control circuit 50 in two stages: (i) by setting a Vdclink voltage range for the pre-regulator 20 to deliver and to stay within (coarse regulation), and (ii) by changing/controlling the LLC converter 30 switching frequency, and therefore, the LLC converter 30 gain to meet LV regulation needs (fine regulation).

Although not shown in FIG. 6, the LLC control circuit 50 also controls the switches Q7 and Q8 as synchronous rectifiers to provide a rectified output voltage to the battery LV. The LLC control circuit 50 also receives an external LV/Ilv set signal and outputs a Vdclink min set signal and a Vdclink max set signal to the pre-regulator control circuit 40 that sets the voltage level of the voltage Vdclink. The external LV/Ilv set signal is generated by the LV BMS. The BMS communicates to the LLC control 50 the output current that maximizes the LV battery life. The BMS avoids overcharging and excessive output current when the LV battery is undercharged. Also, the LLC converter 30 is controlled in a narrow Vdclink voltage range (between Vdclink min and Vdclink max), and the pre-regulator 20 is pre-regulating between Vdclink min and max to maximize pre-regulation in the bypass mode.

As mentioned above, the Vdclink min set and Vdclink max set values can be determined empirically during the DC converter design based on testing the LLC converter 30 around the resonance and evaluating circuit operational parameters and efficiency. For example, the Vdclink min set and Vdclink max set can be determined to keep the efficiency above a certain value, e.g., about 92% within measurement tolerances or higher, about 97% or higher, or about 98% or higher. The Vdclink min set and Vdclink max set can be determined such that efficiency loss from operating at frequencies away from the resonance frequency is less than the efficiency loss of the pre-regulator 20 operating in the buck mode or boost mode. Alternatively, the Vdclink min set and Vdclink max set values can be determined based on statistical analysis of empirical data or through an optimization algorithm. During the DC-DC converter operation, the Vdclink set min and Vdclink max values can be updated as often as the controllers 40 and 50 and the communication channels can handle.

The pre-regulator control circuit 40 senses the voltage of the battery HV indicated at line 42, the output current indicated at line 46, and the voltage Vdclink indicated at line 44. Although not shown in FIG. 6, the pre-regulator control circuit 40 can also sense the input current from the battery HV. The LLC control circuit 50 senses the voltage Vdclink indicated at line 52, the input current indicated at line 46, the output voltage indicated at line 54, and the output current indicated at line 56.

Current and voltage sensors can be used for both the pre-regulator and LLC control circuits 40, 50 to optimize their efficiency. The pre-regulator control circuit 40 can calculate the efficiency of the pre-regulator 20 using the input current and voltage and the output current and voltage. The LLC control circuit 50 can calculate the efficiency of the LLC converter 30 using the input current and voltage and the output current and voltage. The pre-regulator control circuit 40 and the LLC control circuit 50 can use the calculated efficiencies to optimize the efficiencies of the pre-regulator 20 and the LLC converter 30 (i.e., to maximize the overall efficiency).

Figure 4:
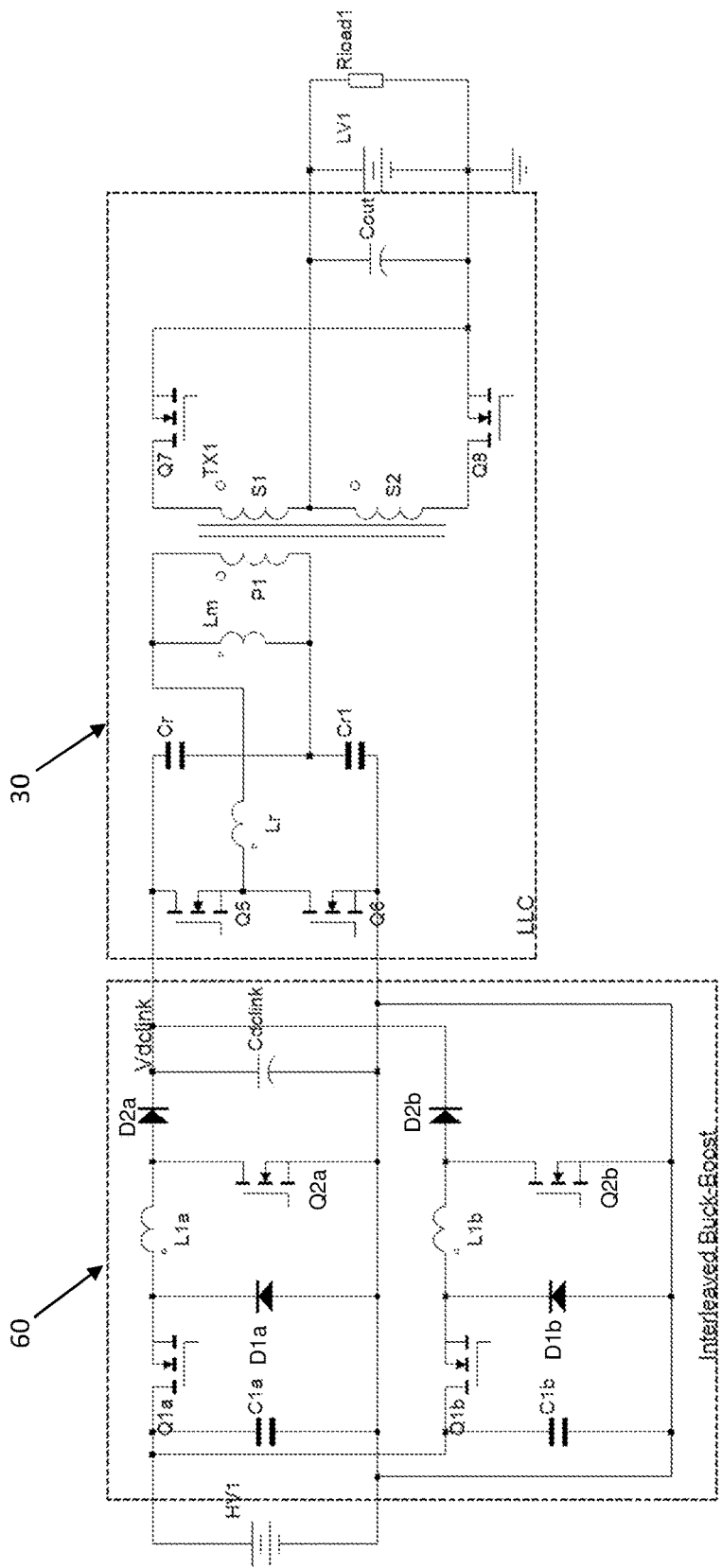
FIG. 4 illustrates a circuit diagram of an interleaved pre-regulator in a cascade connection with an LLC converter according to a second preferred embodiment of the present invention.

FIG. 4 illustrates a circuit diagram of an interleaved pre-regulator 60 in a cascade connection with an LLC converter circuit 30 according to a second preferred embodiment of the present invention.

Figure 8:
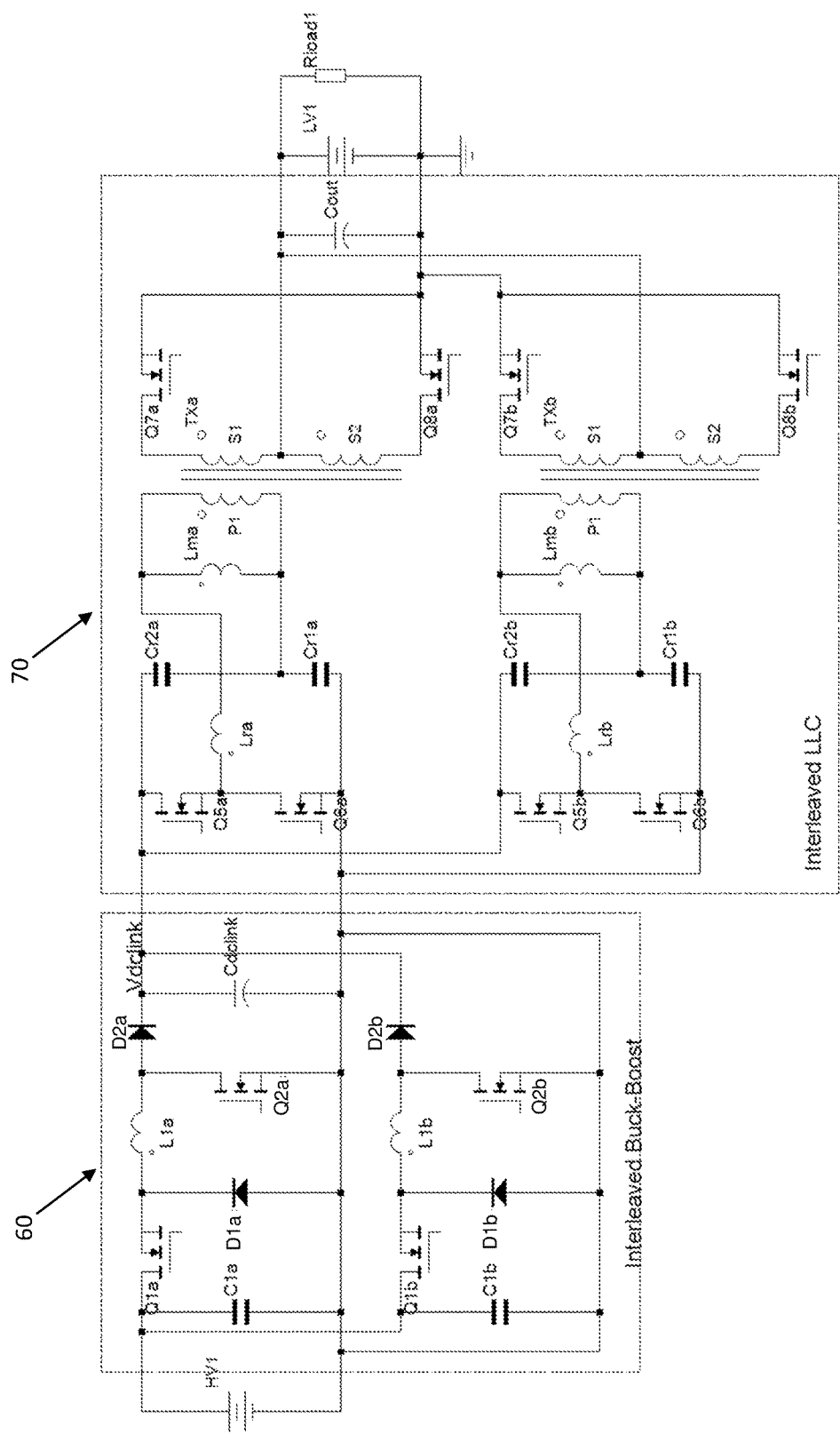
FIG. 8 illustrates a circuit diagram of an interleaved pre-regulator in a cascade connection with an interleaved LLC converter according to a third preferred embodiment of the present invention.

FIG. 4 shows the interleaved pre-regulator 60 as the input to the LLC converter 30 as the interleaved pre-regulator 60 is between the battery HV1 and the LLC converter 30. The LLC converter 30 outputs to the battery LV1. Although not shown FIG. 4, the LLC converter 30 can also be interleaved as shown in FIG. 8 with an additional LLC converter or converters connected in parallel with the LLC converter 30. The additional LLC converter(s) can have the same arrangement as the LLC converter 30. The interleaved LLC converters can share a single output capacitor Cout. For example, in applications with higher power levels, the LLC converter 30 can include two or more interleaved channels.

The LLC converter 30 of FIG. 4 is the same as that described above with respect to FIG. 3. A description here will be omitted for brevity.

The interleaved pre-regulator 60 shown in FIG. 4 can include two identical pre-regulator channels, e.g. two buck-boost converters, described above with respect to FIG. 2, in parallel with each other and driven with the same frequency but 180 degrees out of phase. That is, the top and the bottom channels of the interleaved pre-regulator are the same as the pre-regulator described with respect to FIG. 2. For DC-DC converters with a higher rated power, the number of interleaved channels can increase to 3 or 4 with a corresponding phase difference (e.g., 120° or 90°). From the battery HV1, each of the top and the bottom pre-regulator channel circuits respectively includes an input capacitor C1a, C1b; a first diode D1a, D1b; a first switch Q1a, Q1b; an inductor L1a, L1b; a second switch Q2a, Q2b; a second diode D2a, D2b; but the top and bottom pre-regulator channels share the one DC link capacitor Cdclink. Because of the reduced current ripple achieved by interleaving channels, it is possible to use a smaller capacitor as the DC link capacitor Cdclink. For example, it possible to use a film capacitor instead of an electrolytic capacitor, whose characteristics degrade at very low temperatures. For the same capacitance value, a film capacitor is larger and more expensive than an electrolytic capacitor. But if the capacitance value is reduced as a result of interleaving, then a film capacitor with a smaller capacitance value, and thus a lower cost, can be used. A film capacitor also has a longer life than an electrolytic capacitor. Interleaving also allows the use of an EMI filter capacitor with a smaller capacitance value. The output voltage is represented by Vdclink. FIG. 4 also shows the battery LV1 powering a load Rload1.

As shown in FIG. 4, the interleaved pre-regulator 60 can include two channels of parallel circuits that are out of phase with each other. However, the interleaved pre-regulator 60 is not limited to two parallel pre-regulator channels and can include 3 or 4 (or more) channels in parallel and out of phase to reduce the ripple current on the high voltage and on the voltage Vdclink. This parallel configuration reduces the amount of capacitance and spreads the heat generated by the interleaved pre-regulator 60 for more effective cooling.

FIG. 8 illustrates a circuit diagram of the interleaved pre-regulator 60 in a cascade connection with an interleaved LLC converter circuit 70 according to a third preferred embodiment of the present invention.

FIG. 8 shows the interleaved pre-regulator 60 as the input to the interleaved LLC converter 70 as the interleaved pre-regulator 60 is between the battery HV1 and the interleaved LLC converter 70. The interleaved LLC converter 70 outputs to the battery LV1.

The interleaved pre-regulator 60 of FIG. 8 is the same as that described above with respect to FIG. 4. A description here will be omitted for brevity.

The interleaved LLC converter 70 shown in FIG. 8 can include two identical LLC converter channels in parallel with each other and driven with the same frequency but 180 degrees out of phase. That is, the top and the bottom channels of the interleaved LLC converter are the same as the LLC converter described with respect to FIG. 3.

As shown in FIG. 8, each of the top and the bottom LLC converter channel circuits respectively includes switches Q5a, Q5b, Q6a, Q6b, Q7a, Q7b, Q8a, and Q8b; inductors Lra, Lrb, Lma, and Lmb; capacitors Cr1a, Cr1b, Cr2a, and Cr2b; and transformers TXa and Txb that includes primary winding P1 and dual secondary windings S1 and S2. The top and the bottom LLC converter channel circuits share the output capacitor Cout. The LLC converter 70 is between the interleaved pre-regulator 60 and the battery LV1 and includes Vdclink as the input voltage.

In the interleaved LLC converter 70 of FIG. 8, switches Q5a, Q5b, Q6a, and Q6b and capacitors Cr1a, Cr1b, Cr2a, and Cr2b preferably are arranged in a half bridge arrangement. Components of the LLC converter 70 can also be arranged in a full bridge arrangement with four switches rather than two. Also, the spilt resonant capacitors Cr1a, Cr1b, Cr2a, and Cr2b can be combined into a single component. The interleaved LLC converter 70 can be used in high-power applications.

As shown in FIG. 8, the interleaved LLC converter 70 can include two channels of parallel circuits that are out of phase with each other. However, the interleaved LLC converter 70 is not limited to two parallel LLC converter channels and can include 3 or 4 (or more) channels in parallel and out of phase.

Figure 5:
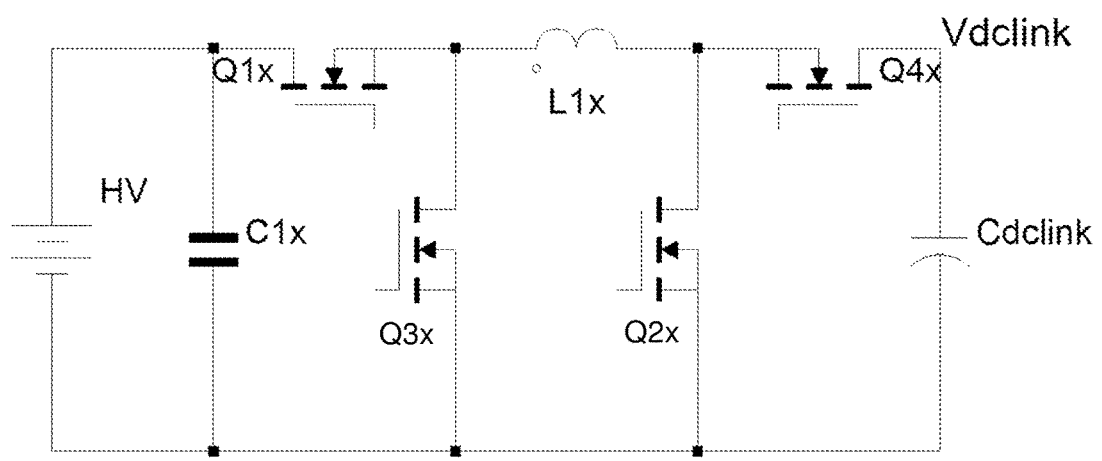
FIG. 5 illustrates a single pre-regulator channel according to the second preferred embodiment of the present invention.

In FIGS. 4 and 8, to further increase overall circuit efficiency, the first diodes D1a and D1b can be replaced by third switches Q3a and Q3b. The second diodes D2a and D2b can also be replaced by fourth switches Q4a and Q4b. Therefore, the interleaved pre-regulator 60 can become a synchronous interleaved pre-regulator. A single pre-regulator channel with the first diode D1x and the second diode D2x respectively replaced with third switch Q3x and fourth switch Q4x, according to the second preferred embodiment, is shown in FIG. 5, where x=a or b. A control circuit (not shown in FIGS. 4, 5, and 8) drives the switches Q3x and Q4x on or off with synchronized high frequency variable duty cycle pulses. The control circuit separately turns off the switches Q3x and Q4x during the times when the diodes D1x and D2x would block current, and turns on the switches Q3x and Q4x when the diodes D1x and D2x would conduct current.

To operate the interleaved pre-regulator 60 in synchronous buck mode to provide a lower voltage, the control circuit separately drives switches Q1x and Q3x to switch ON/OFF with a high-frequency variable duty cycle and drives switch Q2x only OFF and switch Q4x only ON.

To operate the interleaved pre-regulator 60 in synchronous boost mode to provide a higher voltage, the control circuit drives switches Q1x only ON and Q3x only OFF and separately drives switches Q2x and Q4x to switch ON/OFF with a high-frequency variable duty cycle.

To operate the interleaved pre-regulator 60 in synchronous bypass mode to provide the voltage from the battery HV, the control circuit drives switches Q1x and Q4x only ON and switches Q2x and Q3x only OFF.

FIG. 7 shows a block diagram of an interleaved pre-regulator 60 in a cascade connection with an LLC converter 30 including control circuits 80, 90. FIG. 7 includes a block representing the interleaved pre-regulator 60 according to the second preferred embodiment of the present invention in between the battery HV and a block representing the LLC converter 30. FIG. 7 also includes a block representing a pre-regulator control circuit 80 that controls the switching of the interleaved pre-regulator 60, and a block representing an LLC control circuit 90 that controls the switching of the LLC converter 30. In FIG. 7, the pre-regulator control circuit 80 provides signals Q1x, Q2x, Q3x, and Q4x, where x=a and b for two phases, x=a, b, and c for three phases, etc. The pre-regulator control circuit 80 provides drive signals that are out of phase. For example, in buck mode with two phases, the switching ON/OFF of switches Q1a and Q3a is out of phase with the switching ON/OFF of switches Q1b and Q3b.

As shown in FIG. 7, the pre-regulator control circuit 80 controls the switching of the switches Q1a to Q4b in the interleaved pre-regulator 60. The LLC control circuit 90 controls the switching of the switches Q5 and Q6 in the LLC converter 30 by providing signals Q5x and Q6x. Similar to the control described above with respect to FIG. 6, switches Q5 and Q6 can operate at the same high switching frequency, each with approximately 50% duty cycle, but in opposite phases such that when one of the switches Q5 and Q6 is on, the other switch Q6 and Q5 is off. During the switching transition time (i.e., from on to off, from off to on) there is a small dead-time period when both switches Q5 and Q6 are off to ensure that both switches Q5 and Q6 are not on at the same time. The switching frequency is varied in a small range around the resonant frequency to adjust the LLC converter gain, and therefore to adjust the LV voltage and/or current. The LLC converter 30 in FIG. 7 can be replaced with the interleaved LLC converter 70. The LLC control circuit 90 can control the switching of the switches Q5a, Q5b, Q6a, and Q6b in the LLC converter 70 by providing signals Q5x and Q6x, where x=a and b for two phases in the LLC converter 70.

Although not shown in FIG. 7, the LLC control circuit 90 also controls the switches Q7 and Q8 as synchronous rectifiers to provide a rectified output voltage to the battery LV. If the LLC converter includes multiple phases, then the LLC control circuit 90 can provide signals to switch each of the synchronous rectifiers in the phases. The LLC control circuit 90 also receives an external LV/IIv set signal and outputs a Vdclink min set signal and a Vdclink max signal to the pre-regulator control circuit 80 that sets the voltage level of the voltage Vdclink. The pre-regulator control circuit 80 senses the voltage of the battery HV indicated at line 82, the output current indicated at line 86, and the voltage Vdclink indicated at line 84. Although not shown in FIG. 7, the pre-regulator control circuit 80 can also sense the input current from the battery HV. The LLC control circuit 90 senses the voltage Vdclink indicated at line 92, the input current indicated at line 86, the output voltage indicated at line 94, and the output current indicated at line 96. Similar to the control of the DC-DC converter shown in FIG. 6, the external LV/IIv set signal is generated by the LV battery BMS (not shown). The BMS communicates to the LLC control 50 the output current that maximizes the LV battery life. The BMS avoids overcharging and excessive output current when the LV battery is undercharged. Also, the LLC converter 30 is controlled in a narrow Vdclink voltage range (between Vdclink min and Vdclink max), and the pre-regulator 20 is pre-regulating between Vdclink min and max to maximize pre-regulation in the bypass mode.

Because the interleaved pre-regulator 60 includes more switches than the pre-regulator 20 of FIG. 6, the pre-regulator control 80 is more complex. When the pre-regulator 60 is in the buck or boost mode, there are dead-time periods between when switch Q1x is on and when switch Q3x is on and between when switch Q2x is on and when switch Q4x is on. When switch Q1x is on, switch Q3x is off, and when switch Q3x is on, switch Q1x is off. When switch Q2x is on, switch Q4x is off, and when switch Q2x is on, switch Q4x is off.

Current and voltage sensors can be used for both the pre-regulator and LLC control circuits 80, 90 to optimize their efficiency. The pre-regulator control circuit 80 can calculate the efficiency of the pre-regulator 60 using the input current and voltage and the output current and voltage. The LLC control circuit 90 can calculate the efficiency of the LLC converter 30 using the input current and voltage and the output current and voltage. The pre-regulator control circuit 40 and the LLC control circuit 50 can use the calculated efficiencies to optimize the efficiencies of the pre-regulator 60 and the LLC converter 30 (i.e., to maximize the overall efficiency).

The present invention has been described in terms of preferred embodiments. It will be understood that the certain modifications and variations of the various features described above with respect to those preferred embodiments are possible without departing from the spirit of the present invention. It should be understood that the foregoing description is only illustrative of the present invention. Various alternatives and modifications can be devised by those skilled in the art without departing from the present invention. Accordingly, the present invention is intended to embrace all such alternatives, modifications, and variances that fall within the scope of the appended claims.

What is claimed is:

1. A switching power conversion circuit comprising:
   a pre-regulator circuit that is operated in buck mode, boost mode, or bypass mode and that includes a first switching circuit that receives an input DC voltage and outputs a first DC voltage;
   a resonant circuit including a second switching circuit that receives the first DC voltage and outputs an output DC voltage;
   a resonant control circuit that regulates the output DC voltage by transmitting a link min set control signal and a link max set control signal and by controlling a switching frequency of the second switching circuit; and
   a pre-regulator control circuit that receives the link min set control signal and the link max set control signal from the resonant control circuit and that controls the first switching circuit based on the link min set control signal and the link max set control signal from the resonant control circuit to regulate the first DC voltage; wherein
   the first switching circuit includes a first switch and a second switch;
   the pre-regulator control circuit operates the first switch and the second switch with variable duty cycle pulses; and
   the pre-regulator control circuit operates the pre-regulator circuit:
      in a buck mode by switching the first switch on and off and the second switch off;
      in a boost mode by switching the first switch on and the second switch on and off; and
      in a bypass mode by switching the first switch on and the second switch off.

2. The switching power conversion circuit of claim 1, wherein the first DC voltage is determined based on resonant operation of the resonant circuit, the output DC voltage, and the input DC voltage.

3. The switching power conversion circuit of claim 2, wherein the first DC voltage is further determined based on an input current into the pre-regulator circuit, a current between the pre-regulator circuit and the resonant circuit, and an output current of the resonant circuit.

4. The switching power conversion circuit of claim 1, wherein the first DC voltage is determined based on efficiencies of the pre-regulator circuit and of the resonant circuit.

5. The switching power conversion circuit of claim 1, wherein
   the first switching circuit further includes third and fourth switches; and
   the pre-regulator control circuit operates the third and fourth switches with variable duty cycle pulses.

6. The switching power conversion circuit of claim 5, wherein the pre-regulator control circuit operates the pre-regulator circuit:
   in the buck mode that is a synchronous buck mode by switching the first switch and third switch on and off, the second switch off, and the fourth switch on;
   in the boost mode that is a synchronous boost mode by switching the first switch on, the third switch off and the second switch and the fourth switch on and off; and
   in the bypass mode that is a synchronous bypass mode by switching the first switch and the fourth switch on and the second switch and the third switch off.

7. The switching power conversion circuit of claim 1, wherein the pre-regulator circuit further includes at least one additional first switching circuit that is interleaved with the first switching circuit.

8. The switching power conversion circuit of claim 7, wherein the resonant circuit further includes at least one additional second switching circuit that is interleaved with the second switching circuit.

9. A switching power conversion circuit comprising:
   a pre-regulator circuit that is operated in buck mode, boost mode, or bypass mode and that includes at least two first switching circuits in parallel, that receives an input DC voltage, and that outputs a first DC voltage; and
   a resonant circuit including at least one second switching circuit that receives the first DC voltage and outputs an output DC voltage; wherein
   each of the at least one first switching circuits includes a first switch and a second switch;
   the pre-regulator control circuit operates each of the first and second switches with variable duty cycle pulses; and
   the pre-regulator control circuit operates each of the at least two first switching circuits:
      in a buck mode by switching the first switch on and off and the second switch off;
      in a boost mode by switching the first switch on and the second switch on and off; and
      in a bypass mode by switching the first switch on and the second switch off.

10. The switching power conversion circuit of claim 9, further comprising:
    a resonant control circuit that regulates the output DC voltage by transmitting a link min set control signal and a link max set control signal and by controlling a switching frequency of the at least one second switching circuit; and
    a pre-regulator control circuit that receives the link min set control signal and the link max set control signal from the resonant control circuit and that controls the at least two first switching circuits based on the link min set control signal and the link max set control signal to regulate the first DC voltage.

11. The switching power conversion circuit of claim 10, wherein
    each of the at least one first switching circuit further includes a third switch and a fourth switch; and
    the pre-regulator control circuit operates each of the third and fourth switches with variable duty cycle pulses.

12. The switching power conversion circuit of claim 11, wherein the pre-regulator control circuit operates each of the at least two first switching circuits:
- in the buck mode that is a synchronous buck mode by switching the first switch and third switch on and off, the second switch off, and the fourth switch on;
- in the boost mode that is a synchronous boost mode by switching the first switch on, the third switch off and the second switch and the fourth switch on and off; and
- in the bypass mode that is a synchronous bypass mode by switching the first switch and the fourth switch on and the second switch and the third switch off.

13. The switching power conversion circuit of claim 10, wherein the first DC voltage is determined based on resonant operation of the resonant circuit, the output DC voltage, and the input DC voltage.

14. The switching power conversion circuit of claim 13, wherein the first DC voltage is further determined based on an input current into the pre-regulator circuit, a current between the pre-regulator circuit and the resonant circuit, and an output current of the resonant circuit.

15. The switching power conversion circuit of claim 10, wherein the first DC voltage is determined based on efficiencies of the pre-regulator circuit and of the resonant circuit.

16. The switching power conversion circuit of claim 9, wherein the at least one second switching circuit includes two second switching circuits that are interleaved with each other.

* * * * *